UNITED STATES PATENT OFFICE.

NATHAN ROSEWATER, OF CLEVELAND, OHIO.

PROCESS OF DECAFFEINATING NATURAL BEANS.

1,073,929.  Specification of Letters Patent.  Patented Sept. 23, 1913.

No Drawing.  Application filed November 1, 1912. Serial No. 728,995.

*To all whom it may concern:*

Be it known that I, NATHAN ROSEWATER, a citizen of the United States, residing at Cleveland, in the county of Cuyahoga and State of Ohio, have invented a certain new and useful Improvement in Processes of Decaffeinating Natural Beans, of which the following is a full, clear, and exact description.

The object of this invention is to substantially eliminate caffein and other xanthins from natural beans (particularly coffee beans); and to produce as a product beans which are substantially free from caffein and other xanthins, but which contain substantially all of the other natural constituents of the beans in altered positional relation, but in unchanged chemical condition, except to the extent that such chemical condition can be changed by water and heat only.

The invention is more especially an improvement upon the process which forms the subject matter of my prior Patent No. 1,016,294.

Regarded as an improvement upon said prior process, this invention has for its object the production of the desired product with greater certainty and completeness, and in a shorter time, and at reduced expense.

The fundamentally novel step of the process consists in preliminarily subjecting the green beans to dry heat of a temperature such as will sterilize them and thereby prevent subsequent germination and consequent chemical change, and will dry and crack the outer skins; and at the same time in so stirring said beans about in contact with one another that said skins will be substantially rubbed off. This preliminary treatment, while of especial value in connection with subsequent steps which include the applications of only water and heat to effect the desired results, may also be practised to advantage upon beans which are designed to be subsequently treated with various chemical solvents, other than water, of the ingredients which are to be removed, or removed and reincorporated.

In carrying out my invention the green beans are preferably put into a revolving coffee roaster of any well known construction or other suitable apparatus and subjected to dry heat and to agitation in contact with one another. This contactual agitation will be produced by the ordinary operation of the coffee roaster. The desired results may be produced by heating the beans to a temperature of approximately 212° to 220° F.; and this heat may be applied for from fifteen to twenty minutes. The result of this treatment will be that the beans are completely sterilized, so that subsequent germination and consequent chemical change, as a result of such germination, is impossible. The skins of the beans will have been dried and will crack open and will be rubbed off. These sterilized and decorticated beans are next macerated in very cold water,—as near the freezing point as it is practical to maintain it. How much water should be used, how often it should be changed, and how long each maceration should be continued depends upon how completely it is desired to remove the cold water extractives. With most beans, however, satisfactory practical results will be secured if in each maceration enough cold water is used to keep the beans well covered when they are swollen, (this will be about two pints for each pound of beans); and if the water be changed only once,—that is if the beans are subjected to two cold water macerations, and if each maceration in cold water is continued for about twelve hours. These directions, however, are not arbitrary, and may be departed from to such extent as may be required to produce desired results. The cold water extract will contain a large proportion of the water soluble constituents of the beans, except the caffein and other xanthins,—the balance being negligible. The beans are next macerated in very hot water,—at or near the boiling point. The water may be changed as often as desired, or as is necessary to produce desired results. Satisfactory results may, however, be produced generally by using for each hot water maceration about five to eight times as much water as was used in the cold water macerations. Each hot water maceration should be continued from three to six hours. Each of such hot water macerations will remove a very considerable part of the caffein and other xanthins remaining in the beans. With ten hot water macerations fully 95% or more of these substances may be removed. The more macerations and the more water used each time, the smaller will be the percentage of caffein or xanthin left in the beans. The beans are then dried, and are immersed in the cold water extract, which should have been previously condensed to such volume that the beans may absorb substantially all of it. When this has been accomplished, the beans are then dried by any well known process, and the product is completed. The beans may be subsequently roasted, and the roasted beans ground in order to be in condition for making a beverage therefrom.

The beans when they have been dried, after their absorption of the cold water extracts, will be substantially unchanged structurally except to the extent that such change is produced by water and heat alone. A very large percentage of caffein and other xanthins will have been removed; and the ingredients restored will be chemically unaltered, except to the extent that chemical change therein has resulted from the mere application of heat and the use of water. Whatever chemical changes may have taken place, if any, are therefore only those which always take place in these same ingredients when natural beans are merely roasted, ground, and boiled in hot water to produce the coffee beverage.

Having described my invention, I claim:

1. The herein described process of treating natural beans containing caffein and other xanthins for the purpose of substantially eliminating therefrom said caffein and other xanthins, which consists in first subjecting the same to the influence of dry heat of a temperature sufficient to sterilize the beans, and in agitating said beans in contact with one another whereby they are decorticated; in dissolving out of the sterilized and decorticated beans the caffein and other xanthins together with other soluble constituents of the beans; and in subsequently restoring to the beans by absorption the removed constituents other than caffein and other xanthins.

2. The herein described process of treating natural beans containing caffein and other xanthins for the purpose of substantially eliminating therefrom said caffein and other xanthins, which consists in first subjecting the same to the influence of dry heat of a temperature sufficient to sterilize the beans, and in simultaneously agitating said beans in contact with one another whereby they are decorticated; in next macerating said sterilized and decorticated beans in cold water as many times as may be necessary to produce cold water extracts of approximately all of the cold water soluble constituents of the beans; in subsequently macerating said beans in hot water thereby producing a hot water extract of the caffein and other xanthins; in then drying the beans; in subsequently causing the dried beans to absorb the cold water extract; and in finally drying said beans.

In testimony whereof, I hereunto affix my signature in the presence of two witnesses.

NATHAN ROSEWATER.

Witnesses:
   E. L. THURSTON,
   A. J. HUDSON.